United States Patent
Tanaka

[19]
[11] Patent Number: 5,937,357
[45] Date of Patent: Aug. 10, 1999

[54] NETWORK COMPRISING BASE STATIONS FOR SELECTIVITY CALLING MOBILE UNITS BY CALL RADIO SIGNALS OF DIFFERENT BIT RATES IN PHASE COINCIDENCE

[75] Inventor: Hironao Tanaka, Tokyo, Japan

[73] Assignee: NEC Corporation, Tokyo, Japan

[21] Appl. No.: 08/855,991

[22] Filed: May 14, 1997

[30] Foreign Application Priority Data

May 15, 1996 [JP] Japan .................................. 8-120464

[51] Int. Cl.⁶ .................................................. H04B 7/26
[52] U.S. Cl. ........................ 455/503; 455/524; 455/31.2; 370/312
[58] Field of Search .................................. 455/502, 503, 455/67.6, 63, 524, 13.1, 13.2, 31.2, 31.3; 370/312, 313

[56] References Cited

U.S. PATENT DOCUMENTS

| | | | |
|---|---|---|---|
| 4,649,543 | 3/1987 | Levine | 455/502 |
| 4,800,560 | 1/1989 | Aoki et al. . | |
| 5,077,759 | 12/1991 | Nakahara | 455/502 |
| 5,195,091 | 3/1993 | Farwell et al. | 455/502 |
| 5,402,424 | 3/1995 | Kou . | |
| 5,423,056 | 6/1995 | Linquist et al. | 455/502 |
| 5,537,398 | 7/1996 | Siwiak | 455/503 |
| 5,561,701 | 10/1996 | Ichikawa | 455/31.2 |
| 5,697,051 | 12/1997 | Fawcett | 455/13.2 |
| 5,734,985 | 3/1998 | Ito et al. | 455/503 |
| 5,781,539 | 7/1998 | Tanaka | 370/312 |
| 5,818,820 | 10/1998 | Anderson et al. | 370/280 |

FOREIGN PATENT DOCUMENTS

| | | |
|---|---|---|
| 63-227135 | 9/1988 | Japan . |
| 6291713 | 10/1994 | Japan . |
| 6311088 | 11/1994 | Japan . |

*Primary Examiner*—Reinhard J. Eisenzopf
*Assistant Examiner*—Duc Nguyen
*Attorney, Agent, or Firm*—Sughrue, Mion, Zinn, Macpeak & Seas, PLLC

[57] ABSTRACT

For selective call of mobile units operable at different bit rates, a central station announces a launch start instant of each signal frame to a plurality of base stations based on phase coincident clocks used individually in the central and the base stations. Responsive to call requests of the different bit rates, their time sequential order in each signal frame, and a switching instants of switching one of the bit rates to another, the base stations transmit the call radio signals starting simultaneously in phase coincidence at the launch start instant Preferably, the central and the base stations deal with the requests as packets. Any one of the base stations can reduce its transmission power of the call radio signals if a failure is found therein in one of the call requests delivered thereto.

20 Claims, 7 Drawing Sheets

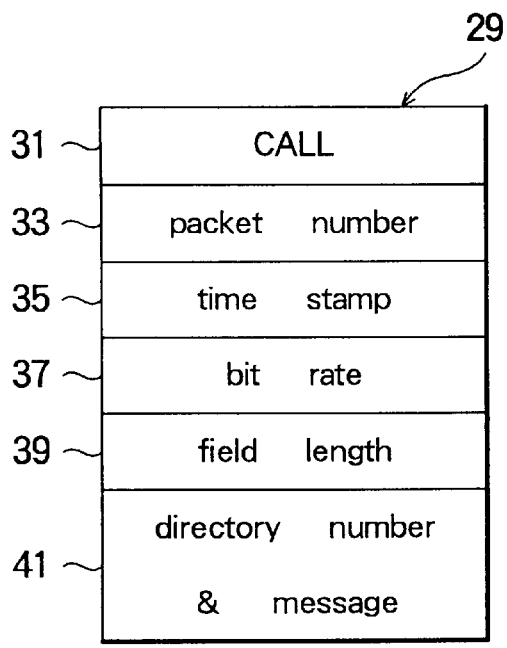
FIG. 3
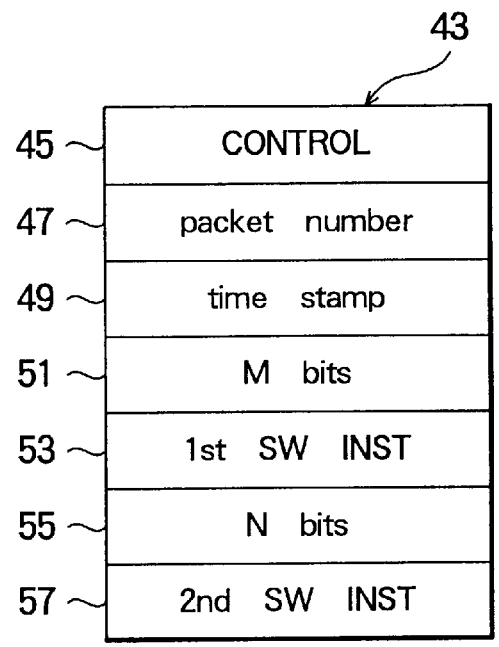
FIG. 4
| DURATION | EVENT | BASE CLOCK |
|---|---|---|
| 1 | 87(1) count down<br>87(2) count down | 1st base clock |
| 2 | 87(1) count out<br>87(2) count down | 2nd base clock |
| 3 | 87(1) count out<br>87(2) count out | 3rd base clock |
FIG. 7

NETWORK COMPRISING BASE STATIONS FOR SELECTIVITY CALLING MOBILE UNITS BY CALL RADIO SIGNALS OF DIFFERENT BIT RATES IN PHASE COINCIDENCE

BACKGROUND OF THE INVENTION:

This invention relates to a selective call radio network for selectively calling a plurality of mobile units which may be pagers or beepers and are called by call radio signals of different bit rates. This invention relates also to a central station and to each of base stations used in the selective call radio network.

This invention relates to an earlier patent application filed by Hironao Tanaka, the present inventor, on May 17, 1996, as patent application Ser. No. 08/648,974.

In the selective call radio network, the base stations are connected to the central station by wired and/or radio channels and altogether have an overall area which comprises a plurality of service areas and in which the mobile units are independently movable. The base stations have the service areas, respectively, two adjacent ones of which have an overlapping area. The call radio signals are transmitted from the base stations to their respective service areas in a predetermined format, such as the POCSAG (Post Office Code Standardisation Advisory Group, the United Kingdom) format, or radio carriers of a common signal frame which is typically 30 seconds long for use in the present invention.

The central station is connected to a communication network which may be a public telephone network and includes a great number of subscriber sets. In the manner which will later become clear, the central station comprises in general a request receiving unit for receiving from the communication network a call request for a selected one of the mobile units as a transmission request of the predetermined format and an announcing device for announcing the transmission request to the base stations in an announced signal. Each base station comprises a signal receiving unit for receiving the announced signal as a received signal specifying the transmission request as a received request and a transmitting device for transmitting to its individual service area the received request in one of the call radio signals. If present in the individual service area, the selected one of mobile units responds to this one of the call radio signals.

In such a selective call radio network, the base stations transmit the call radio signals in a common radio channel to enable the selected one of mobile units to respond in whichever of the service areas. Use of the common radio channel, however, may give rise to an interference between two of the call radio signals in the overlapping area. For example, selective call of the mobile units fails with an appreciably high probability when these two of the call radio signals reach the overlapping area with a phase difference. Consequently, various schemes have already been proposed to make the base stations transmit the call radio signals in phase coincidence.

One of such schemes is disclosed in Japanese Patent Prepublicaion (A) No. 311,088 of 1994. In the selective call radio network of this patent prepublication, a phase reference station is used in transmitting a radio phase reference signal to the base station and in making the base stations thereby adjust transmission timings of the call radio signals to establish the phase coincidence even in the overlapping area.

Another of the schemes is revealed in Japanese Patent Prepublication (A) No. 291,713 of 1994 for a patent application filed by the present assignee in Japan. According to this scheme, use is made of a satellite radio signal emitted by a GPS (global positioning system) satellite. Each of the central station and the base station comprises a GPS receiver for extracting a GPS timing signal from the satellite radio signal. The central and the base stations comprise timing signal generators responsive to the GPS timing signal for generating central and base timing signals of an identical timing. From the central station, the announced signal is announced to the base stations with a transmission start time instant indicated therein for the call radio signal based on the central timing signal. The transmission start time instant is decided to be later than an announcing time instant of announcement of the announced signal from the central station by a time delay which is not shorter than an arithmetic sum of a longest propagation time interval between the central station and a remotest base station and a maximum processing time interval of processing the received signal into the call radio signal in the base stations. Each base station processes the received signal by forming a queue of received requests in successive received signals to begin transmission of the call radio signal at the transmission time instant based on the base timing signal. In this manner, the phase coincidence of the call radio signals is insured at the base stations.

Instead of using the satellite radio signal of the GPS satellite, use is possible of a method and network disclosed in U.S. Pat. No. 5,402,424 issued to Yukari Kou. Kou patent will be described far later in the description and is incorporated herein by reference. Another network is revealed in U.S. Pat. No. 4,800,560 issued to Takahiro Aoki and another and is incorporated herein by reference.

It is necessary in such a selective call radio network to use only a limited number of radio channels for the great number of mobile units. It has therefore been planned to give a higher bit rate to the call radio signal, such as 1,200 bps (bits per second) instead of 512 bps. This has resulted in use of mobile units of various bit rates in a single selective call radio network. In other words, each base station must transmit the call radio signals of various bit rates. As a result, the phase coincidence must be very strict for high bit rate call radio signals. Despite this necessity, only one bit rate is used in the schemes proposed in the patent prepublications cited above.

Assignment of one radio channel to the call radio signals of each bit rate is possible on transmitting such call radio signals with different bit rates. It should, however, be noted in this connection that traffic of calls not necessarily be uniform over the different bit rates and that the traffic may vary or be biassed with time. This would result in an unfavorable state such that the radio channel of a low bit rate may not be so busy at a time while the radio channel of a high bit rate may fall into overflow in the meanwhile and that the radio channels are not used with an excellent efficiency. Alternatively, it is possible to assign the different bit rates to signal frames according to the call radio signals included in the signal frames. This would result, when the signal frames have a common frame length predetermined as in the POCSAG format by a period of queues of the call radio signals, in another unfavorable state such that the signal frames unavoidably have an idle duration as a result of fluctuations dependent on the bit rates in the traffic and that effective use of the radio channels is difficult.

It may be possible to use a variable frame length depending on the bit rates by using different formats other than the POCSAG format. This, however, results in difficulty in specifying the transmission start time instants of the respective signal frames as precisely discrete time intervals shorter than one second when the transmission time instants are specified by the central station. Moreover, various restrictions give rise to another difficulty in fulling up the idle duration between two successive signal frames to a sufficient extent. If a short frame length were used in consideration of the traffic dependent on the bit rates, an increase would be inevitable in rates of the idle duration to such short signal frames. This again reduces the efficiency of utilizing the radio channels.

A technology proposed in Japanese Patent Prepublication (A) No. 227,135 of 1988 is useful in coping with the fluctuations in the traffic with the common frame length used for various bit rates. According to this technique, each signal frame comprises a plurality of subframes equal in number to groups into which the mobile units are classified in accordance with the different bit rates. The signal frame further comprises a frame and bit synchronization pattern for the subframes. It is, however, described in this patent prepublication that the mobile units must comprise call radio signal receivers specific to the groups of different bit rates.

SUMMARY OF THE INVENTION

In view of the foregoing, it is a principal object of the present invention to provide a selective call radio network in which a great number of mobile units of different bit rates can be called without deteriorating effective use of radio channels.

It is another principal object of this invention to provide a selective call radio network which is of the type described and comprises a plurality of base stations connected to a central station in respective service areas and in which each base station can transmit call radio signals of the different bit rates to its service area with the call radio signals kept in phase coincidence with similar call radio signals transmitted from others of the base stations.

It is still another principal object of this invention to provide a selective call radio network which is of the type described and in which two adjacent ones of the service areas have an overlapping area and can nevertheless introduce little interference in the overlapping area between the call radio signals transmitted to the two adjacent ones of the service areas.

It is yet another principal object of this invention to provide a selective call radio network which is of the type described and which can keep the phase coincidence even if the bit rates extend as high as up to 1,200 bits per second.

It is a further principal object of this invention to provide a selective call radio network which is of the type described and in which the mobile units need not be specifically designed.

It is another further principal object of this invention to provide a selective call radio network which is of the type described and which can cope with traffic variations and a traffic bias in the bit rates.

It is still another further principal object of this invention to provide a selective call radio network which is of the type described and in which the central station can specify, based on a network phase prototype, a launch start time instant of launching each signal frame of the call radio signals simultaneously from the base stations.

It is yet another further object of this invention to provide a selective call radio network which is of the type described and in which the central station specifies, relative to the launch start time instant and for each of the base stations, a switching time instant of switching from one to another of the bit rates in the call radio signals to thereby enable the selective call network to cope with the traffic variations and the traffic bias.

It is a subordinate object of this invention to provide a selective call radio network which is of the type described and in which each mobile unit is not misoperative even though the mobile unit is responsive to a predetermined one of the different bit rates.

It is another subordinate object of this invention to provide a selective call radio network which is of the type described and in which each mobile unit is capable of responding, while present in the overlapping area, to the call radio signals transmitted to one of the two adjacent service areas even when a fault takes place in the call radio signals transmitted to the other of the two adjacent service areas.

It is still another subordinate object of this invention to provide a selective call radio network which is of the type described and which each mobile unit can receive, while present in the overlapping area, one of the call radio signals that is directed thereto, even if a fault is present in this one of the call radio signals.

It is yet another subordinate object of this invention to provide a selective call radio network which is of the type described and which deals with call requests of different bit rates as packets to provide the call radio signals of the different bit rate even when the bit rates extend up to a very high bit rate of 1,200 bits per second.

It is a different object of this invention to provide a central station for use in the selective call radio network of the type described.

It is another different object of this invention to provide a base station for use in the selective call radio network of the type described.

Other objects of this invention will become clear as the description proceeds.

In accordance with an aspect of this invention, there is provided a selective call radio network for selectively calling a number of mobile units responsive to call radio signals transmitted in successive signal frames and at a plurality of predetermined bit rates and movable in an overall area comprising service areas wherein each of the service areas is assigned to one of several base stations connected to a central station, and wherein two adjacent service areas have an overlapping area, wherein: (A) the central station comprises: (Aa) request receiving means for receiving at a time a quantity, capable of being included in each of the signal frames, of incoming call requests of the bit rates as transmission request; (Ab) request assigning means for assigning, according to the bit rates, the transmission requests to the signal frames as assigned requests; (Ac) request arranging means for arranging the assigned requests according to a predetermined intraframe bit rate order in each of the signal frames as ordered requests; (Ad) central timing means for timing a central timing signal as a network phase prototype; (Ae) launch timing means for timing, based on the central timing signal and in consideration of the base stations, launch time instants of successively launching the signal frames simultaneously from the base stations; (Af) switch time deciding means for deciding, relative to each of the launch start time instants, successive switching time instants of switching from one of the bit rates to a next succeeding one of the bit rates in the bit rate order for each signal frame; and (Ag) announcing means for announcing the ordered requests as announced requests to the base stations in response to the launch time instants and the switch time instants in an announced signal specifying the launch start and the switching time instants; (B) each of the base stations comprising: (Ba) signal receiving means for receiving the announced signal as a received signal specifying the announced requests and the launch start and the switching time instants as received requests, received start instants, and received switching instants; (Bb) base timing means for timing a base timing signal in time coincidence with the central timing signal as a network phase prototype; (Bc) clock generating means responsive to the base timing signal for generating a plurality of clock sequences in one-to-one correspondence to the bit rates in phase coincidence with the base timing signal; (Bd) clock selecting means for selecting base clock sequences from the plurality of clock sequences in accordance with the bit rate order at each of the received start instants and successively at the received switching instants; (Be) request reproducing means responsive to the base clock sequences for reproducing a sequence of reproduced requests in correspondence to the received requests; and (Bf) signal transmitting means for transmitting the reproduced requests in the call radio signals at the received start instants to one of the service areas assigned to a respective base station.

In accordance with a different aspect of this invention, there is provided a central station for use as each of the above-recited central station in the selective call radio network set forth in the above-mentioned aspect of this invention.

In accordance with another different aspect of this Invention, there is provided a base station for use as each of the above-recited base stations in the selective call radio network set forth in the first-mentioned aspect of this invention.

BRIEF DESCRIPTION OF THE DRAWING

FIG. 3 shows a call packet for use in the central station depicted in FIG. 2;

FIG. 4 shows a control packet for use in the central station depicted in FIG. 2;

FIG. 7 shows a list for use in describing operation of the clock generator depicted in FIG. 6;

DESCRIPTION OF THE PREFERRED EMBODIMENT

Figure 1:
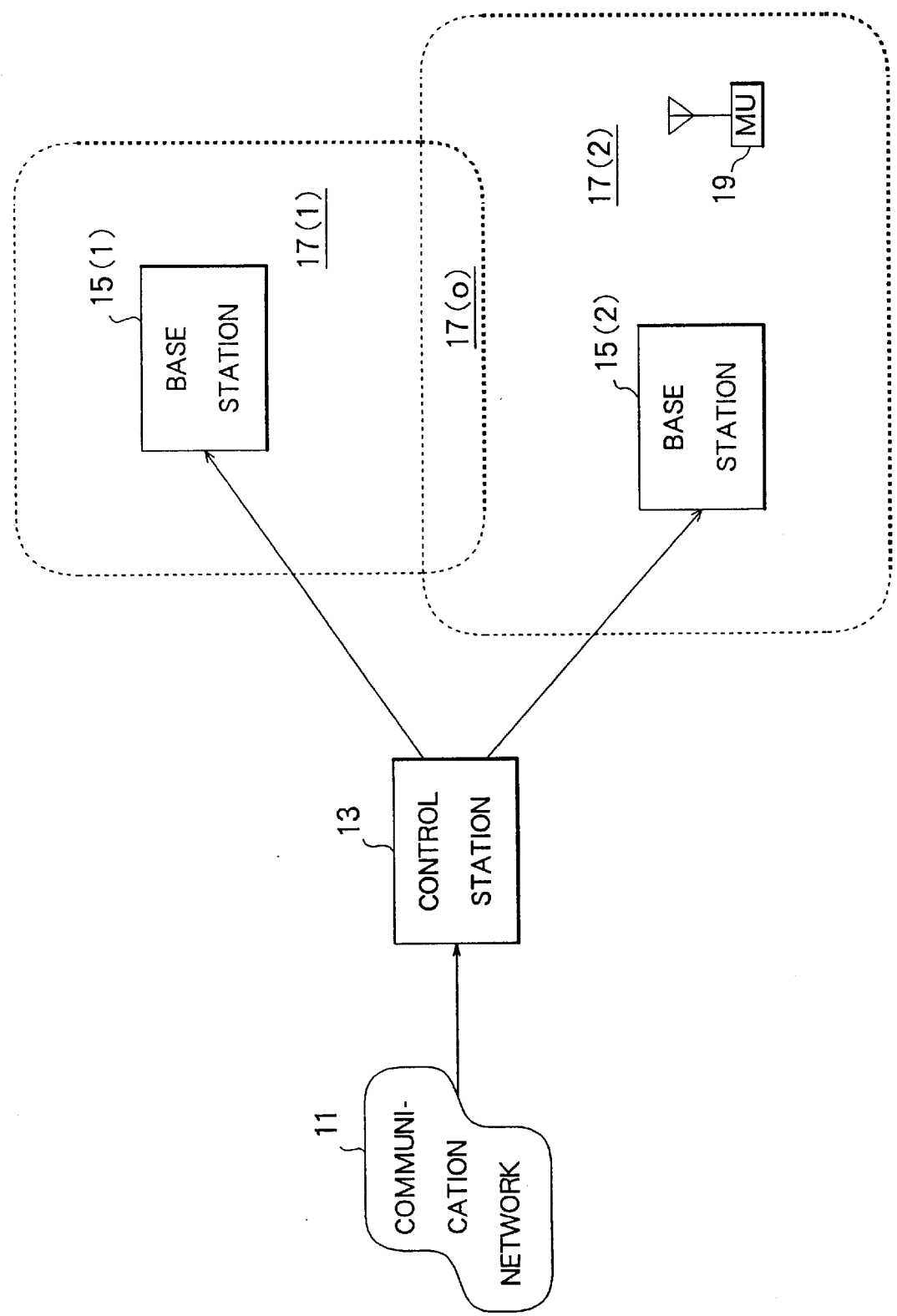
FIG. 1 is a general representation of a selective call radio network known in the art and also of the selective call network according to an embodiment of the instant invention.

Referring to FIG. 1, a known selective call radio network will be described in general. It should be noted that a selective call radio network according to a preferred embodiment of the present invention is not different insofar as depicted.

Such a selective call radio network comprises a communication network 11 which may be a public telephone network and includes a great number of subscriber sets (not shown). A control or central station 13 is connected to the communication network 11. A plurality of base stations 15 are connected to the central station 13 by wired and/or radio channels. In the example being illustrated, the base stations 15 are first and second base stations 15(1) and 15(2) which have first and second service areas 17(1) ad 17(2). Such service areas are altogether called an overall area. In general, two adjacent service areas, such as 17(1) ad 17(2), have an overlapping area 17(o). A plurality of mobile units are movable in the overall area. As a representative of the mobile units, a mobile unit 19 is depicted in the second service area 17(2) and is indicated by a label MU. The mobile units, such as 19, may be pagers or beepers and are selectively called by call radio signals which are transmitted from each base station at a plurality of predetermined bit rates. Usually, the mobile unit 19 responds to a call radio signal of a specific one of the bit rates.

In operation in general, it will be assumed that a subscriber calls one of the mobile units and that this one of mobile units is the mobile unit 19. From the communication network 11, a call request, representative of a subscriber directory number of the mobile unit 19 and accompanied by a message, reaches the central station 13 as an incoming call request. In the central station 13, this call request is converted eventually to a digital request of a predetermined format. This latter request is herein called an announcement request for the time being. The central station 13 announces or conveys such announced requests in a multiple address fashion to the base station 15. In the base station 15, this announcement request is eventually transmitted in one or more signal frames in one of the call radio signals to the service areas 17(1) and 17(2) in a single radio channel. In the manner discussed heretobefore, care must be taken so that the mobile unit 19 may receive the call radio signals transmitted from the base station 15 in phase coincidence wherever the mobile unit 19 may be in the overall area.

For this invention, it will be presumed that the predetermined format is composed of digital signals and that the predetermined bit rates are first, second, and third bit rates, two of which may be 512 bps and 1,200 bps exemplified hereinabove. Each signal frame is 30 seconds long.

Broadly speaking, the phase coincidence is achieved in the selective call radio network by developing a phase prototype, namely, a prototype for phase, as by receiving a satellite signal of a GPS (global positioning system) satellite at the central station 13 and the base stations 15. Based on the phase prototype, the call radio signals of the first through the third bit rates are mixedly included in each signal frame in accordance with traffic of the first through the third bit rates.

Figure 2:
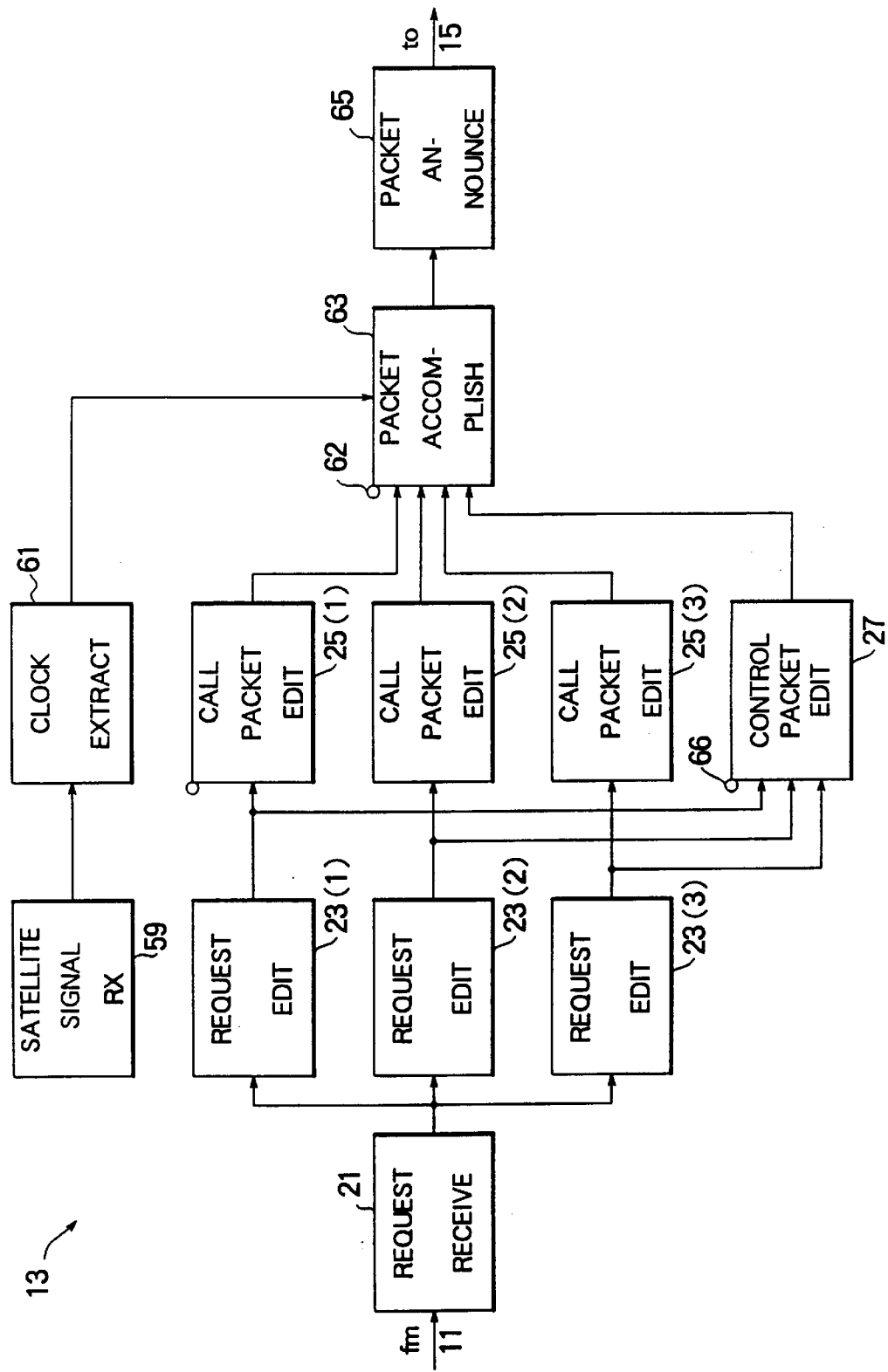
FIG. 2 is a block diagram exemplifying a central station for use according to this invention in the selective call radio network illustrated in FIG. 1.

Referring to FIG. 2 with FIG. 1 continuously referred to, the central station 13 comprises a request receiving unit 21 for receiving, as a transmission request, an incoming call request for one of the first through the third bit rates from the communication network 11. When such transmission requests for various bit rates reach a predetermined quantity which can be included in each signal frame, the request receiving unit 21 suspends reception of such incoming call requests. The request receiving unit 21 therefore produces at a time the transmission requests of a total request length or duration which is equal to or shorter than a common frame length of the signal frames.

For this purpose, the request receiving unit 21 calculates as regards each transmission request a duration which is necessary for each of the base stations 15 to transmit the announcement request in the call radio signals. Subsequently, the request receiving unit 21 sums up into the total request length such durations in connection with the incoming call requests successively received.

From the request receiving unit 21, the transmission requests for the first through the third bit rates are delivered to first through third request editing units 23(1), 23(2), and 23(3) which correspond to the first through the third bit rates and are designated either singly or collectively by 23 with suffixes (1) through (3) omitted. Similar designation will be used throughout this specification. According to the first bit rate, the first request editing unit 23 selects each transmission request for the first bit rate as a first selected request from the transmission requests for the first through the third bit rates and edits the first selected request into a first edited request of layer 3 in accordance with the predetermined format of digital signals, such as the POCSAG (Post Office Code Standardisation Advisory Group) format. In a similar manner, the second and the third request editing units 23 select second and third selected requests and edit the second and the third selected requests into second and third edited requests. Inasmuch as the first through the third selected requests are later placed in the signal frames after being edited and then successively processed as will become clear in the following, the request editing units 23 are herein referred to alternatively as assigning units for assigning the transmission requests to each signal frame as assigned requests according to the bit rates.

From the first through thee third request editing units 23, the edited requests are delivered to first through third call packet editing units 25(1), 25(2), and 25(3) or 25 and altogether to a control packet editing unit 27. Each of the first through the third call packet editing units 25 converts the edited packet for a relevant bit rate of the first through the third bit rates to a call packet. The control packet editing unit 27 edits the first through the third edited requests into a control packet Indicative, in each signal frame, primarily of switching time instants of switching from one of the first through the third bit rates to another of the bit rates.

Mobile directory numbers are assigned to the respective mobile units, such as 19, operable at the first through the third bit rates. Each call packet includes, among others, of information of the mobile directory numbers given to the mobile units operable at the relevant bit rate and of the message following each mobile directory number. The mobile units to be called are variable in number depending on the incoming call requests for the relevant bit rate. On the other hand, each call packet has a packet length or duration decided so that the call packets are effectively transmitted between the central station 13 and the base station 15, namely, in accordance with a channel quality of transmission channels through which the announcement requests are transmitted. Consequently, the transmission requests for the relevant bit rate are usually divided into a plurality of call packets. For example, the transmission requests for the first bit rate are divided into ten first call packets. Together with the control packet, the first through the third call packets are therefore arranged in each signal frame in accordance with a predetermined intraframe bit rate order and are given serial packet numbers. Arranged in the bit rate order, the call packets are herein referred to alternatively as ordered requests.

The control packet is used in each of the base stations 15 in formulating the announcement requests for successive signal frames. As a consequence, the control packet must be placed first in each signal frame and is assigned with the packet number of "one", namely, a first packet number.

Turning to FIG. 3 during a short while with FIGS. 1 and 2 continuously referred to, the call packet is depicted at 29 for the relevant bit rate. The call packet 29 comprises a first call field 31 as a call field which indicates that this packet 29 is one of the call packet and is labelled CALL.

A second call field 33 is a packet number field indicative of the packet number. A third call field 35 indicates a launch start time instant which will presently be described and is alternatively called a time stamp. A fourth call field 37 indicates the relevant bit rate. A fifth call field 39 indicates a field length of a next succeeding call field. Next succeeding the fifth call field 39, a sixth call field 41 is for the information of the mobile directory number and of the message.

Further turning to FIG. 4 with reference to FIGS. 1 and 2 continued, the control packet is depicted at 43. The control packet 43 comprises a first control field 45 which indicates that this packet 43 is that for control and is labelled CONTROL. A second control field 47 is another packet number field indicative of the first packet number "1". A third control field 49 indicates the launch start time instant as the time stamp. A fourth control field 51 indicates a first call signal length of the call radio signals of the first bit rate, which length depends on the number of mobile units operable at the first bit rate and a message length following the first selected request. It will now be presumed that the bit rate order is predetermined by ordinal numbers given to the bit rates, namely, from the first bit rate to the second bit rate and from the second bit rate to the third bit rate, that the first bit rate is switched to the second bit rate at a first switching time instant of the switching time instants described before, and that the second bit rate is switched to the third bit rate at a second switching time instant of the switching time instants.

In the manner which will presently be described turning back to FIG. 2 and will later be described with reference to FIG. 7, first through third central clock sequences are produced at the first through the third bit rates. It will be presumed that the first call signal length is M bits long in terms of clocks of the first central clock sequence. In FIG. 4, a fifth control field 53 of the control packet 43 indicates the first switching time instant and is indicated by a label 1st SW INST. A sixth control field 55 indicates a second call signal length of the call radio signals of the second bit rate. The second call signal length is similar to the first call signal length and is presumed as N bits long when represented by clocks of the second central clock sequence. A seventh control field 57 indicates the second switching time instant by another label 2nd SW INST. The first and the second switching time instants have their origins of measure in common at the launch start time instant.

More particularly referring to FIGS. 1 through 3, each of the call packet editing units 25 produces information indicative of the call packet and places this information in the first call field 31, produces information of the relevant bit rate and sets this latter. information in the fourth call field 37, and furthermore produces the information described in the foregoing and places this last-mentioned information in the sixth call field 41. Furthermore, the field length of the sixth call field is measured in terms of clocks of a central clock sequence of the relevant bit rate and placed in the fifth call field 39. At this stage of operation of the central station 13, the second and the third call fields 33 and 35 are left vacant.

It should be noted that the call packets, such as 29, have a predetermined packet length and consequently the field length of a predetermined length. It is therefore needless to put information in the fifth call field 39 unless the call packet 29 is edited as a last packet from one of the incoming call requests that stands last in the total request length and therefore will be placed last in each signal frame with a short packet length given. This short packet length is later calculated by the central clock sequence of the relevant bit rate and placed in the fifth call field 39. The second, the third, and the fifth call fields 33, 35, and 39, are therefore left vacant at this stage of operation of the central station 13.

In particular referring to FIGS. 1, 2, and 4, the control packet editing unit 27 produces information indicative of the control packet and places this information in the first control field 45, uses the first selected requests in calculating the first call signal length as the above-mentioned M bits and in setting the M bits in the fourth control field 51, and furthermore uses the second selected requests in calculating the second call signal length as the above-mentioned N bits and in setting the N bits in the sixth control field 55. In the meantime, the control packet editing unit 27 calculates a first time interval necessary for each of the base stations 15 to transmit the call radio signals for the M bits at the first bit rate and a second time interval necessary in transmitting the radio call signals of the N bits at the second bit rate and finds the first switching time instant as a first least integer which is not less than a first quotient of the first time interval divided by a clock period of the second central clock sequence. The second switching time instant is given by a sum of the first least integer and a second least integer which is not less than a second quotient of the second time interval divided by a clock period of the third central clock sequence. At this stage, the second and the third control fields 47 and 49 are left vacant.

Turning back to FIG. 2 with FIG. 1 again referred to, a central satellite signal receiver 59 receives the satellite signal of the GPS satellite as a central received satellite signal. Connected to the satellite signal receiver 59, a central clock extractor 61 extracts a very precise clock signal from the received satellite signal, which serves as the network phase prototype. Connected to the first through the third call packet and the control packet editing units 25 and 27 and including means 62 connected to the central clock extractor 61 to produce the first through the third central clock sequences at the first to the third bit rates, a packet accomplishing unit 63 calculates the launch start time instant as the time stamp in the third call and control fields 35 and 49 illustrated in FIGS. 3 and 4. It should be noted that the launch start time instant is common to the base stations 15 and makes it possible for the mobile unit 19 to respond to call radio signals with a shortest delay. Furthermore, the packet accomplishing unit 63 arranges the control packet preceding each signal frame and then the first through the third call packets successively in each frame according to the bit rate order as ordered packets including ordered requests, counts the ordered packets as the packet number starting at "2" in each signal frame for the call packets among the ordered packets and sets "1" in the second control field 47 depicted in FIG. 4 for the control packet in the ordered packets and "2" and others in the second call fields, such as 33 of FIG. 3, of the call packets in the ordered packets. In this manner, the packet accomplishing unit 63 completes formation of the packet sequence of the control and the ordered packets.

Connected to the packet accomplishing unit 63, a packet announcing unit 65 copies the packet sequence to produce a plurality of copied sequences, equal in number to the base stations 15 and announces to the base stations the copied sequences as an announced signal either singly or in combination. The announced signal includes the control packet and the call packets as announced packets, namely, the ordered requests as announced requests or the before-mentioned announcement requests, and specifies the packet numbers, the time stamp or the launch start time instant for each signal frame, and the switching time instants.

It should be understood in connection with the foregoing that the first through the third central clock sequences are produced in the control packet editing unit 27 by using means for frequency dividing the central timing signal supplied from the central clock extractor 61 through connection omitted from FIG. 2 merely for simplicity of illustration. Only the means is depicted by a small circle with a reference numeral 66 as means for calculating the launch start time instants and for deciding the switching time instants. The packet accomplishing unit 63 calculates the time stamp in consideration of the base stations, or more in detail, a longest propagation delay in announcement of the announced signal from the central station 13 to a remotest one of the base stations including reannouncement and a maximum processing time for the base stations to transmit the announced signal in the call radio signals so that most preceding signal frames of the call radio signals may concurrently be transmitted from the base stations.

Referring afresh to FIG. 5 and again to FIGS. 1 and 2, each base station, such as 15(1) or 15(2), comprises a packet receiving unit as a base signal receiving unit 67 for receiving the announced signal as a base received signal which specifies the announced packets as received packets, namely, the announced requests as received requests, the packet numbers, the launch start time instant as a received start instant, and the switching time instants as received switching instants. The received packets include the control packet and the ordered packets. Connected to the signal receiving unit 67, a packet rearranging unit 69 rearranges the received packets as rearranged packets of successive packet groups by referring first to the third control and call fields 49 and 35 of FIGS. 4 and 3 in accordance with the launch start time instant or the received start instant and subsequently referring to the second control and call fields 47 and 33 in accordance with the packet numbers with the control packet placed first in each packet group. The call packets follow in each packet group the control packet in an ascending order of the packet numbers.

Connected to the packet rearranging unit 69, a time instant extractor 71 extracts the control packet with reference to the first fields 31 and 45 of FIGS. 3 and 4 from the rearranged packets as an extracted packet, a content of the third control field 49 of FIG. 4 as an extracted start instant, or the received start instant, and contents of the fifth and the seventh control fields 53 and 57 as first and second extracted switching instants or the received switching instants.

Connected also to the packet rearranging unit 69, a start coincident packet or call packet storing unit 73 refers to the first fields 31 and 45 of FIGS. 3 and 4 to take the call packets of successive groups into consideration. Referring to the third control and call fields 43 and 35 in the control and the call packets of the successive groups, the start coincident packet storing unit 73 selects the call packets having a common time stamp with that of the control packet as selected packets and stores the selected packets as stored packets of each packet group.

Figure 5:
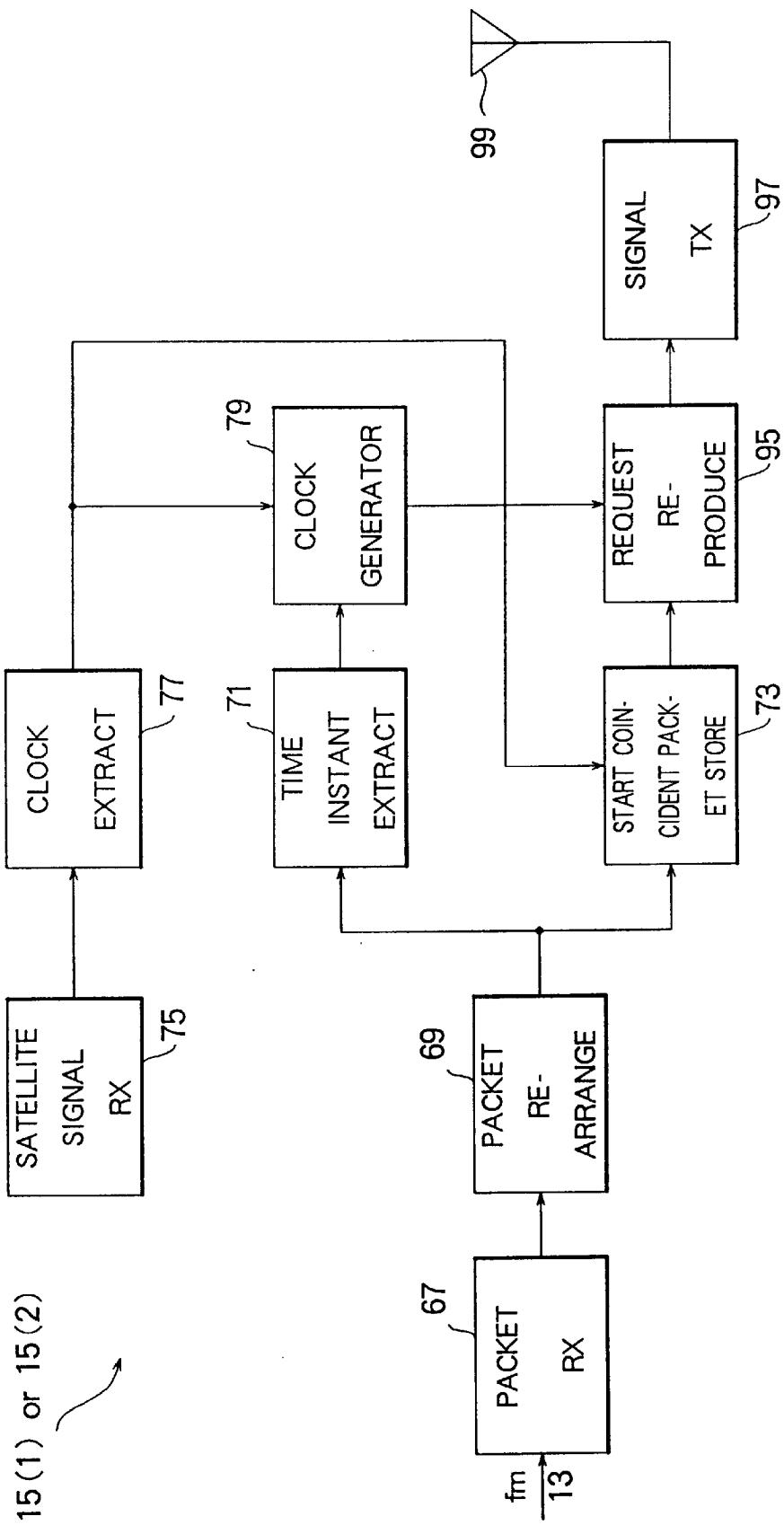
FIG. 5 is a block diagram exemplifying a base station for use according to this invention in the selective call radio network illustrated in FIG. 1.

In FIG. 5, a base satellite signal receiver 75 receives the satellite signal of the GPS satellite as a base received satellite signal. From the base satellite received signal, a base clock extractor 77 extracts a base timing signal which is in time coincidence with the central timing signal and serves as a network phase auxiliary prototype. Responsive to the base timing signal, a clock regenerator 79 produces a base clock sequence as will be described in the following. The clock regenerator 79 is supplied from the switching instant extractor 71 with the extracted start instant and the first and the second extracted switching instants.

Figure 6:
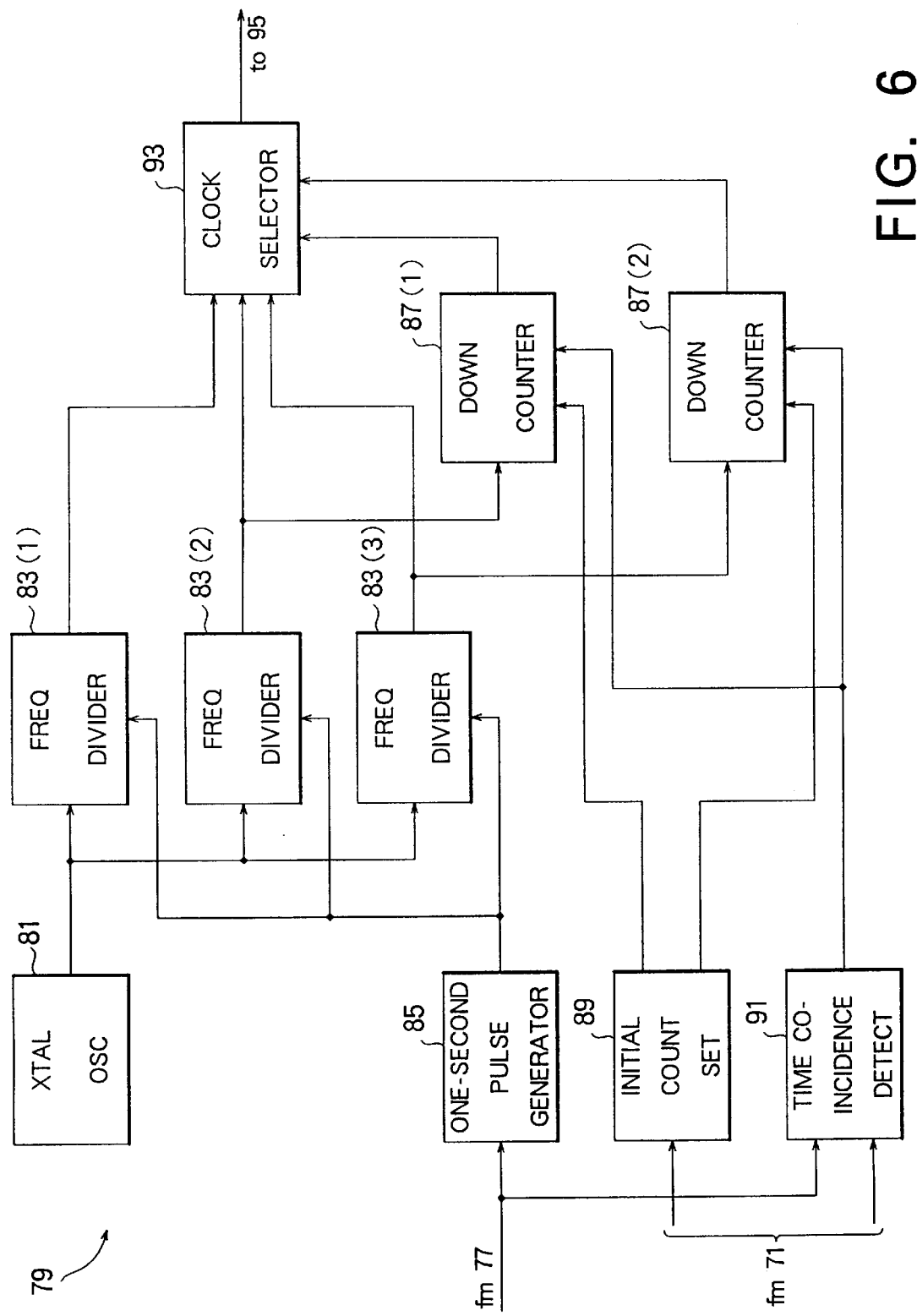
FIG. 6 is a block diagram of a clock generator for use in the base station depicted in FIG. 5.

Turning temporarily to FIG. 6 with FIG. 5 continuously referred to, the clock regenerator 79 comprises a high precision crystal oscillator 81 for generating an oscillation signal of an oscillation frequency which is equal to an integral multiple of a least common multiple of regenerated clock frequencies of regenerated clock sequences. Connected to the crystal oscillator 81, first through third frequency dividers 83(1), 83(2), and 83(3) or 83 frequency divides the oscillation frequency to produce, as the regenerated clock sequences, a first regenerated clock sequence of a first regenerated clock frequency corresponding to the first bit rate, a second regenerated clock sequence of a second regenerated clock sequence of a second regenerated clock frequency corresponding to the second bit rate, and a third regenerated clock sequence of a third regenerated clock frequency corresponding to the third bit rate.

From the base clock extractor 77, the base timing signal is delivered to a one-second pulse generator 85 which produces a sharp pulse sequence at a highly precise one-second pulse period. The pulse sequence is supplied to the first through the third frequency dividers 83 to simultaneously reset them at every one second. Consequently, the first through the third frequency dividers 83 are in operation with correct phase coincidence with the one-second pulse sequence. In this manner, the first through the third regenerated clock sequences are produced in all base stations 15 in phase coincidence precisely with the base timing signals phase-adjusted therein to the central timing signal produced in the central station 13.

Connected to the second phase divider 83(2), a first down counter 87(1) is enabled, as will very shortly be described, to count clocks of the second regenerated clock sequence and to decrease a first count down towards zero at the second bit rate. Connected to the third frequency divider 83(3), a second down counter 87(2) is likewise enabled to count clocks of the third regenerated clock sequence and to decrease a second count to zero at the third bit rate. Supplied from the time instant extractor 71 with the first and the second extracted switching instants, an initial count setting unit 89 sets the first extracted switching instant in the first down counter 87(1) as a first initial count and the second extracted switching instant in the second down counter 87(2) as a second initial count. Connected to the time instant extractor 71 and to the base clock extractor 77, a time coincidence detecting unit 91 detects as a coincidence instant a time instant of coincidence of a current time instant defined by the base timing signal and a prior time instant which is a signal formulating interval prior to the extracted launch start instant. The signal formulating interval will later be described. Every time when the coincidence instant is detected, the time coincidence detecting unit 91 sends an enable signal to the first and the second down counts 87(1) and 87(2) to enable them; Connected to the first through the third frequency dividers 83 and supplied with first and second counter output signals from the first and the second down counters 87(1) and 87(2), a clock selector 93 selects at a time one of the first through the third regenerated clock sequences to produce, as will become clear in the following, a train of first through third base clock sequences of the first through the third bit rates.

Further turning to FIG. 7 with FIG. 5 and in particular FIG. 6 continuously referred to, relationships will be described between events in the first and the second down counters 87(1) and 87(2) in first through third durations and the first through the third base clock sequences produced by the clock selector 93. The first duration begins at the coincidence instant, when the first and the second extracted time instants are set by the switching instant setting unit 89 in the first and the second down counters 87(1) and 87(2) as the first and the second initial counts and when the first and the second counters 87(1) and 87(2) are enabled by the time coincidence detecting unit 91 at the extracted launch start instant measured by the network phase auxiliary prototype of the base clock extractor 77. In the first duration, the first and the second counts are reduced in the first and the second down counters 87(1) and 87(2) from the first and the second initial counts by the second and the third generated clock sequences, respectively. The first counter 87(1) thus measures at the second bit rate the first switching time instant described before in conjunction with the fifth control field 53 of FIG. 4. The first duration ends when this first switching instant is indicated by an ultimate count of zero of the first counter output signal for the base station 15(1) or 15(2) under consideration. In the meantime, the clock selector 93 produces the first base clock sequence.

Immediately following the first duration, the second duration begins. In the second duration, the first down counter 87(1) is counted down to the ultinate count and ceases to reduce the first count until the first initial count is afresh set therein. The second down counter 87(2) continuously reduces the second count by the third regenerated clock sequence. The second duration ends when the second count reaches the above-mentioned ultimate count of zero, namely, upon a substantial lapse from the extracted launch instant of the sum of the first and the second total signal lengths, which sum is described above with particular reference to FIGS. 1, 2, and 4. In this manner, the second down counter 87(2) in the second duration measures at the third bit rate the second total signal length which is added to the first total length in calculating the second switching time instant. In this manner, the clock selector 93 produces the second base clock sequence.

The third duration immediately follows the second duration. In the third duration, the first and the second down counters 87(1) and 87(2) are no longer operable. The clock selector 93 produces the third base clock sequence which ends when the first and the second initial values are again set in the first and the second down counters 87(1) and 87(2).

Turning back to FIG. 5 with FIGS. 1 and 6 additionally referred to, the clock generator 79 or the clock selector 93 supplies a request reproducing unit 95 with the first base clock sequence of the first bit rate first at the coincidence instant or the received or the extracted start instant, subsequently the second base clock sequence of the second bit rate from the first extracted switching instant, and finally the third base clock sequence of the third bit rate from the second extracted switching instant. Connected to the start coincident packet storing unit 73, the request reproducing unit 95 reads the stored packets of one of the packet groups that is of the stored start instant coincident with the time stamps of the stored packets, namely, with start of supply thereto of the first base clock sequence. Meanwhile, the request reproducing unit 95 successively reproduces the call packets of each packet group in accordance with an ascending order of the packets numbers as reproduced packet. In the example being illustrated, the sixth call fields, such as 41 of FIG. 3, of the reproduced packets are used as a sequence of analog reproduced requests with the predetermined bit rates used in deciding the bit rates of the analog reproduced requests of such sequences. Connected to the request reproducing unit 95, a signal transmitter 97 transmits the sequence of reproduced requests as each signal frame of the call radio signals through a base station antenna 99 on only one of the radio channels to one of the service areas, such as 17(1) and 17(2), belonging to the base station under consideration. In this manner, the stored packets of the packet groups are successively transmitted in the signal frames, respectively. The before-mentioned signal formulating interval is an interval between the coincidence instant and start of transmission by the signal transmitter 97 of the call radio signals.

Referring now to FIG. 8 and again to FIGS. 1, 2, 5, and 6, contents of each signal frame are exemplified for use in reviewing operation of each of the base stations, such as 15(1) and 15(2). A time axis proceeds from left to right. Each signal frame of the call radio signals is typically 30 seconds long as described before and is indicated along a top or first row by a bidirectionally arrow-headed horizontal line. The signal transmitter 97 begins to transmit an initial or first bit of each signal frame at a frame start time instant T(fs) and ends this signal frame at a frame end time instant T(fe). It will be surmised in each signal frame that the first bit rate is switched to the second bit rate at the first switching time instant indicated at T(1) and the second bit rate to the third bit rate at the second switching time instant represented by T(2). That is, one of the mobile units, such as 19, responds to the call radio signals which start at the frame start time instant T(fs) and end at or before the first switching time instant T(1). Another of the mobile units responds to the call radio signals which start at the first switching time instant T(1) and end at or before the second switching time instant T(2). Still another of the mobile units responds to the call radio signals which start at the second switching time instant T(2) and end at or before the frame end time instant T(fe).

In the manner depicted along a second row, a first call radio signal 101 of the first bit rate has the first call signal length of M bits and starts at the frame start time instant T(fs) to end at a first signal end time instant T(1e). A second call radio signal 103 of the second bit rate has the second call signal length of N bits and starts at the first switching time instant T(1) to end at a second signal end time instant T(2e). A third call radio signal 105 of the third bit rate starts at the second switching time instant T(2) and ends at a third signal end time instant T(3e). In the manner described before, the first switching time instant T(1) is measured from the frame start time instant T(fs) by the first least integer which is not less than the first quotient of the first time interval (T(1e)−T(fs)) divided by the clocks of the second bit rate. The second switching time instant T(2) is measure from the frame start time instant T(fs) by the sum (T(2e)−T(fs)) of the first least integer and the second least integer which is not less than the second quotient of the second time interval (T(2e)−T(1)) divided by the clocks of the third bit rate. Consequently, a first loss time may be present between the first signal end time instant T(1e) and the first switching time instant T(1). The first loss time is shorter than one clock period of the second bit rate. A second loss time may be present between the second signal end time instant T(2e) and the second switching time instant T(2) and is shorter than one clock period of the third bit rate. A third loss time is usually present between the third signal end time instant T(3e) and the frame end time instant T(fe). It is, however, impossible to place a call signal in the third loss time. Effective use of the radio channel is hardly adversely affected by such loss times. Far more important is feasibleness of mixedly using the call radio signals of various bit rates in each signal frame depending on the traffic.

It will now be assumed as depicted along third through fifth rows with labels 19(1), 19(2), and 19(3), respectively, that the first through the third call radio signals 101 to 103 are for a first mobile unit 19(1) operable at the first bit rate, a second mobile unit 19(2) operable at the second bit rate, and a third mobile unit 19(3) operable at the third bit rate, the first through the third mobile units 19(1) to 19(3) being represented in FIG. 1 at 19. The first call radio signal 101 comprises a first preamble 101(1) and a first call signal 101(2), both of the first bit rate. The second call radio signal comprises a second preamble 103(1) and a second call signal 103(2), both of the second bit rate. The third call radio signal 103 comprises a third preamble 105(1) and a third call signal 105(2), both of the third bit rate. Such preambles, as 101(1), 103(1), and 105(1), are of a common bit pattern although their bit rates may differ from one another and are used in the mobile units, such as 19, in establishing synchronism. Each of such call signals, as 101(2), 103(2), and 105(2), specifies the mobile directory number and includes the message. When the synchronism is established, one of the mobile units receives the message included in a pertinent call signal of the call signals that is assigned with the mobile directory number specified in the pertinent call signal.

Figure 8:
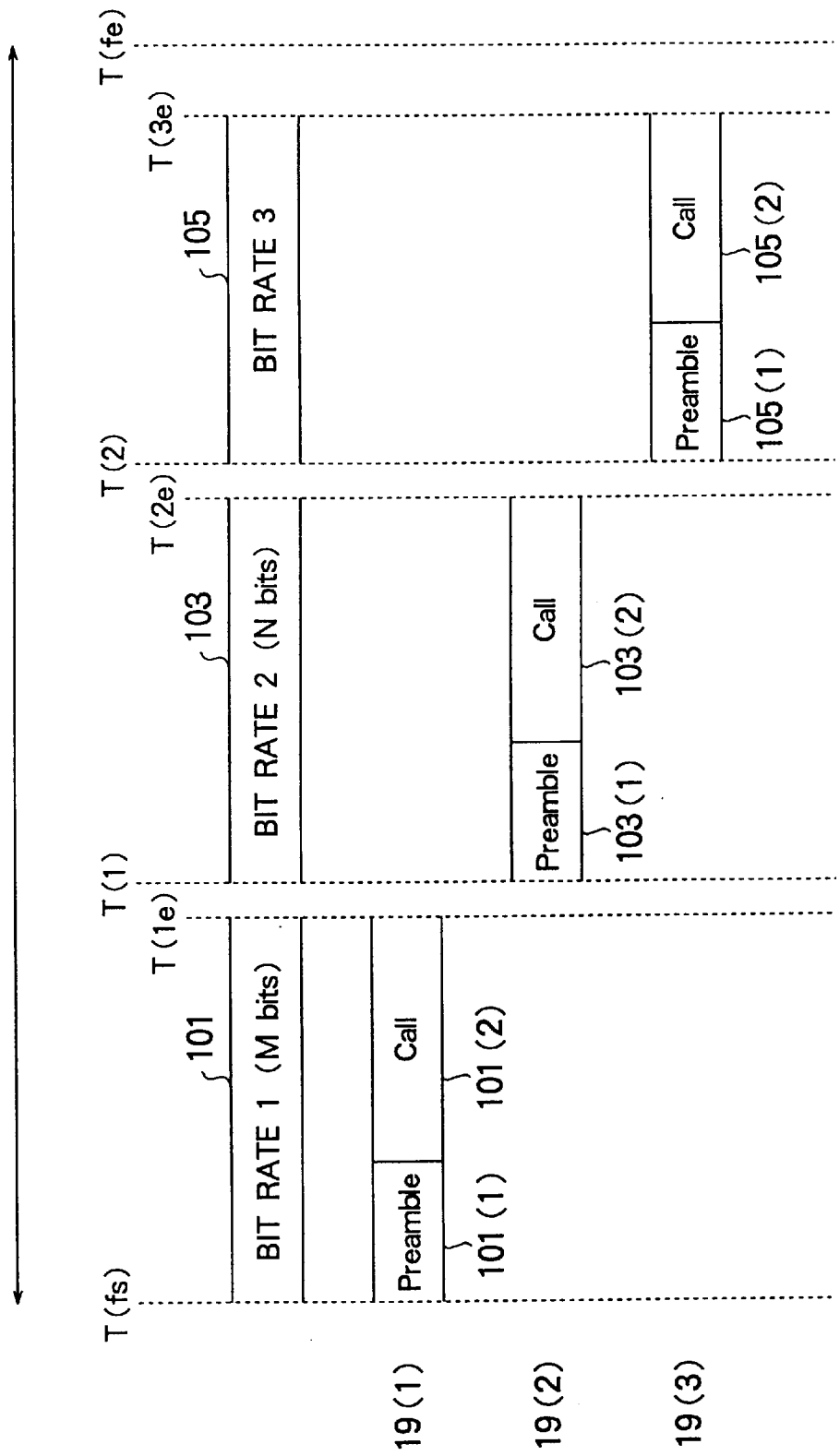
FIG. 8 schematically exemplifies formation of signal frames for use in describing operation of the base station depicted in FIGS. 5 and 6.

In an example described in FIG. 8, one of the signal frames comprises the first through the third call radio signals 101, 103, and 105. While the common frame length is predetermined, the call signal lengths, such as M bits and N bits, are dependent on the request lengths, namely, on the numbers of incoming call requests for the predetermined bit rates. At any rate, it is possible for the request receiving unit 21 to successively sum up such numbers as the total request length which can be included in the common frame length.

Among the call signal lengths, the first and the second call signal lengths can be calculated by the packet accomplishing unit 63 by using the ordered packets for the first and the second bit rates rather than by the control packet editing unit 27 in the manner described before with particular reference to FIGS. 1, 2, and 4. This applies to the first and the second switching instants. Under the circumstances, the control packet editing unit 27 need not include the means 66.

Inasmush as the call signal lengths are dependent on the numbers of incoming call requests, another of the signal frames may comprise the first and the second call radio signals 101 and 103 and only a part of the third call radio signal 105. In such a case, one of the ordered packets would be the last packet of the short length described before more particularly referring to FIGS. 1 through 3. By counting in the ordered packets the call packets in which the third bit rate is placed as the relevant bit rate in the fourth call field 37 of FIG. 3, the packet accomplishing unit 63 finds the last packet and calculates the short packet length for placement of the field length in the fifth call field 39 by the central clock sequence produced by the means 62 at the relevant bit rate.

Inasmuch as the call radio signals of all the bit rates of the selective call radio network are transmitted in a single radio channel, it is necessary that the preambles should not give rise to interference with one another even when the mobile unit or units are in the overlapping area 17(o). Consequently, each and another of the bit rates should have a greatest common measure other than a small integer, such as not greater than sixteen, and are therefore equal to 512 bps and 1,200 bps. This enables effective use of the radio channels.

In the call radio signals of the different bit rates, it is possible to displace the switching time instants, such as T(1) and/or T(2), from one of the signal frames to another depending on the traffic and thereby to cope with the bias or the variation with time of the traffic. The radio call signals are nevertheless kept in correct and precise phase coincidence. It is therefore possible to use a high bit rate.

The switching time instant or instants are common in each signal frame to the base stations 15. This prevents the call radio signals from interfering with one another even when one of the bit rates is switched to another. In addition, this makes it possible to keep the phase coincidence in whichever of the bit rates. In the example being illustrated, the requests are dealt with as packets. It is possible to announce the announced signal from the central station 13 to the base stations 15 at a higher rate than the bit rates of the call radio signals and in a multiplexed fashion so as to reduce the cost of maintaining the propagation channels between the central station 13 to the base station 15. Moreover, this contributes to the effective use of the radio channels and facilitates gradual change of mobile units operable at lower bit rates to the mobile units of a high bit rate.

Figure 9:
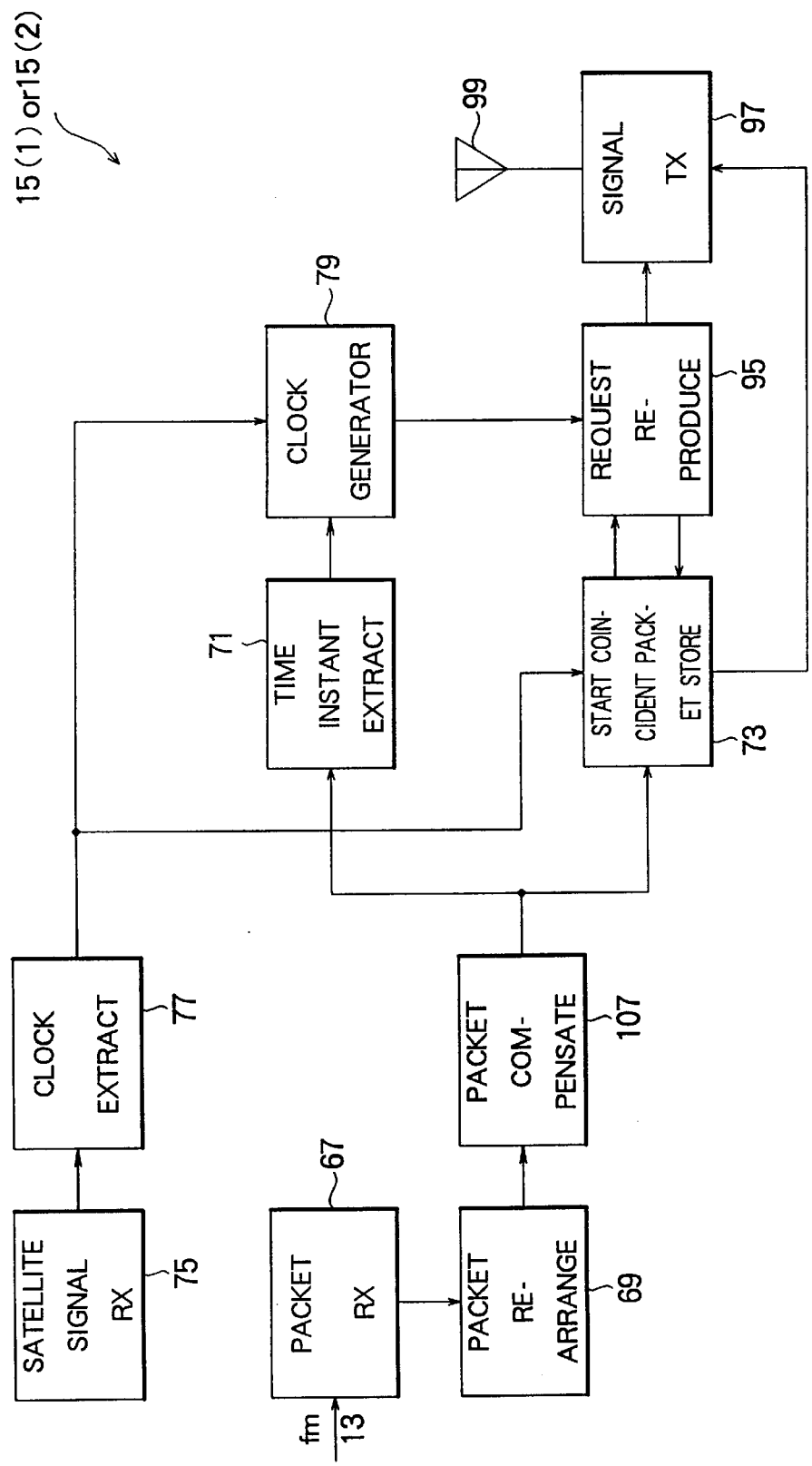
FIG. 9 is a block diagram of a modification of the base station depicted in FIG. 5.

Referring now to FIG. 9 and again to FIG. 1 through 4, the description will proceed to a base station 15(1) or 15(2) according to a modification of that illustrated with reference primarily to FIG. 5. Similar parts are designated by like reference numerals and are similarly operable with likewise named packets and signals except for the following.

Connected between the packet rearranging unit 69 and the timing instant extracting and the start coincident packet storing units 71 and 73, a packet compensating unit 107 is supplied with the rearranged packets including the control packet and the call packets of each packet group. In this modification, the packet rearranging unit 69 detects a missing packet in each packet group by referring to the second control field 47 and the second call fields, such as 33, of the rearranged packets. Responsive to the missing packet which may be one of the call packets of the packet group under consideration, the packet compensating unit 107 refers to the fifth and the seventh control fields 53 and 57 and to either two of remaining call packets next preceding and succeeding the missing packet or one of the remaining packets that next succeeds or next precedes the missing packet when the packet number of this remaining packet indicates two or a penultimate number. In this manner, the packet compensating unit 107 estimates the relevant bit rate of the missing packet and the field length when the missing packet would have an ultimate packet number in the packet group in question. Thereupon, the packet compensating unit 107 compensates for the missing packet a compensation packet in which only the third call field 35 is filled up with an unusual time instant other than the time stamps or the launch start time instant normally used.

The start concident packet 73 is now supplied with all rearranged packets of each packet group which may include the compensation packet. The start coincident packet storing unit 73 first confirms that the control packet of the packet number one is duly conveyed and stores as the stored packets those call packets of the packet numbers of two and greater in the ascending order together with the compensation packet, if any, and delivers the stored packets to the request reproducing unit 95 one by one while confirming the time stamps of the stored packets as regards whether each of the stored start instants is identical with the time stamp of the control packet or includes the unusual time instant. The request reproducing unit 95 temporarily stores such stored packets in a transmitter buffer, which is known in the art and not shown, and reads the transmission buffer by the base clock sequence of the relevant bit rate to further deliver the reproduced packets or the reproduced requests to the signal transmitter 97.

Checking the transmitter buffer, the request reproducing unit 95 sends a packet request signal back to the start coincidence packet storing unit 73 immediately before the transmitter buffer is entirely read out. In response, the start coincident packet storing unit 73 supplies the request reproducing unit 95 with the stored packets of the stored time instant which indicates a next subsequent launch start time instant. When the unusual time instant is found in the stored time instants, the start coincident packet storing unit 73 sends the compensation packet to the request reproducing unit 95 and furthermore sends a power reducing signal directly to the signal transmitter 97 to reduce its transmission electric power to a reduced power until the start coincident packet storing unit 73 again sends the stored packets of the ordinary value to the request reproducing unit 95. During operation of the signal transmitter 97 at the reduced power, the mobile unit or units in the service area of the base station under consideration receive the call radio signals transmitted from an adjacent base station particularly when such a mobile unit is in the overlapping area, such as 17(o).

If the control packet is found missing by the packet rearranging unit 69, a similar compensation packet is delivered from the packet compensating unit 107 with the unusual time instant to the start coincident packet storing unit 73. In response to the similar compensation packet, the start coincident packet storing unit 73 reduces the transmission electric power during the frame length of 30 seconds.

Reviewing FIGS. 1 through 9, what should be noted is as follows. It is possible to use as the predetermined bit rates either only two bit rates, such as 512 bps and 1,200 bps or more than three bit rates and as the predetermined bit rate order one of any other orders provided that such an order is kept throughout a sequence of the radio call signals. It is also possible to use instead of the central satellite signal receiver 59 a high precision crystal oscillator, such as 81, and rather than a base timing device (75, 77) a repeater for receiving the central timing signal per se as the base timing signal and for producing a phase compensation signal for delivery to the frequency dividers, such as 83. instead of the one-second pulse sequence. Alternatively, it is possible to use a satellite communication network described and claimed in the Kou patent referred to hereinabove with a modification which is basically as follows although such a modification will readily occur to one skilled in the art. The satellite of the Kou patent is used as the GPS satellite. Either the reference station and the terrestrial station of Kou's claim 1 or 2 or the center station and other terrestrial stations of Kou's claim 6 are used as the central station 13 and the base stations 15.

While this invention has thus far described in specific conjunction with a preferred embodiment thereof, it will now be readily possible for one skilled in the art to carry this invention into effect in various other manners as will be exemplified in the following. In the call radio signals, the reproduced request may be an analog signal. In this event, the request reproducing unit 95 should produce the reproduced request in analog form. It is possible to use a descending order or any other monotonous order either for the packet subscribers or serial request numbers.

What is claimed is:

1. A selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station and wherein two adjacent service areas have an overlapping area, wherein:

said central station comprises:
- request receiving means for receiving at a time a call request quantity of incoming call requests of said bit rates as transmission requests, wherein said call request quantity is capable of being included in each of said signal frames;
- request assigning means for assigning, according to said bit rates, said transmission requests to said signal frames as assigned requests;
- request arranging means for arranging said assigned requests according to an intraframe bit rate order in each of said signal frames as ordered requests;
- central timing means for timing a central timing signal;
- launch timing means for timing, based on said central timing signal and in consideration of said base stations, launch start time instants of successively launching said signal frames simultaneously from said base stations;
- switch time deciding means for deciding, relative to each of said launch start time instants, successive switching time instants of switching from one of said ordered requests to a next succeeding one of said ordered requests in said intraframe bit rate order for said each signal frame; and
- announcing means for announcing said ordered requests as announced requests to said base stations in response to said launch start time instants and said switching time instants in an announced signal specifying said launch start time instants and said switching time instants;

each of said base stations comprises:

signal receiving means for receiving said announced signal as a received signal specifying said announced requests and said launch start time instants and said switching time instants as received requests, received start instants, and received switching instants, respectively;

base timing means for timing a base timing signal in time coincidence with said central timing signal;

clock generating means, responsive to said base timing signal, for generating a plurality of clock sequences in one-to-one correspondence to said bit rates in phase coincidence with said base timing signal;

clock selecting means for selecting base clock sequences from said plurality of clock sequences in accordance with said intraframe bit rate order at each of said received start instants and successively at said received switching instants;

request reproducing means responsive to said base clock sequences for reproducing a sequence of reproduced requests, having serial request numbers, in correspondence to said received requests;

signal transmitting means for transmitting said reproduced requests as said call radio signals at said received start instants to at least one of said service areas assigned to said each base station; and power reducing means, located between said request reproducing means and said signal transmitting means, for detecting an omitted request number in said serial request numbers reproduced in said sequence of reproduced requests in order to reduce a transmission power of said signal transmitting means during a predetermined time interval.

2. A selective call radio network as claimed in claim 1, wherein said central timing means comprises:
- a standard time generator for generating a standard timing signal as a network phase prototype; and
- a clock extractor for extracting said central timing signal from said standard timing signal.

3. A selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, wherein:

said central station comprises:
- request receiving means for receiving at a time a call request quantity of incoming call requests of said bit rates as transmission requests, wherein said call request quantity is capable of being included in each of said signal frames;
- request assigning means for assigning, according to said bit rates, said transmission requests to said signal frames as assigned requests;
- request arranging means for arranging said assigned requests according to an intraframe bit rate order in each of said signal frames as ordered requests;
- central timing means for timing a central timing signal;
- launch timing means for timing, based on said central timing signal and in consideration of said base stations, launch start time instants of successively launching said signal frames simultaneously from said base stations;
- switch time deciding means for deciding, relative to each of said launch start time instants, successive switching time instants of switching from one of said ordered requests to a next succeeding one of said ordered requests in said intraframe bit rate order for said each signal frame; and
- announcing means for announcing said ordered requests as announced requests to said base stations in response to said launch start time instants and said switching time instants in an announced signal specifying said launch start time instants and said switching time instants;

each of said base stations comprises:

signal receiving means for receiving said announced signal as a received signal specifying said announced requests and said launch start time instants and said switching time instants as received requests, received start instants, and received switching instants, respectively;

base timing means for timing a base timing signal in time coincidence with said central timing signal;

clock generating means, responsive to said base timing signal, for generating a plurality of clock sequences in one-to-one correspondence to said bit rates in phase coincidence with said base timing signal;

clock selecting means for selecting base clock sequences from said plurality of clock sequences in accordance with said intraframe bit rate order at each of said received start instants and successively at said received switching instants;

request reproducing means responsive to said base clock sequences for reproducing a sequence of reproduced requests, having serial request numbers, in correspondence to said received requests; and signal transmitting means for transmitting said reproduced requests as said call radio signals at said received start instants to at least one of said service areas assigned to said each base station;

said base timing means comprises:

a standard time receiver for receiving as a received timing signal a standard timing signal generated in said central station; and a clock extractor for extracting said base timing signal from said received timing signal; and said clock generating means comprises:

a clock generator for generating a generated clock signal;

a pulse generator for generating a pulse signal as a network phase auxiliary standard in phase coincidence with said base timing signal; and a plurality of frequency dividers, equal in number to a first quantity of said bit rates, for frequency dividing a clock frequency of said generated clock signal by said bit rates, respectively, to produce the clock sequences of said plurality of frequency dividers, respectively, wherein said plurality of frequency dividers are reset by said pulse signal.

4. A selective call radio network as claimed in claim 3, wherein a second quantity of said plurality of frequency dividers is equal to a positive integer other than one, said received switching instants being equal in number to said positive integer less one, said clock sequences consisting of one clock sequence and at least one remaining clock sequence, wherein said clock selecting means comprises:

a plurality of counters, equal to or greater in number than said received switching instants, for counting counts when enabled, respectively, to a common end count from at least one initial count in response to said at least one remaining clock sequence;

a time coincidence detector for enabling said counters upon detection of time coincidence between said base timing signal and each of said received start instants;

an initial count setting unit for setting said at least one initial count in said counters, respectively, in said intraframe bit rate order sequentially at said received switching time instants; and a selector for selecting from the clock sequences of said plurality of frequency dividers as said base clock sequences said one clock sequence at said time coincidence and said at least one remaining clock sequence in response to said counts.

5. A selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, wherein:

said central station comprises:

request receiving means for receiving at a time a call request quantity of incoming call requests of said bit rates as transmission requests, wherein said call request quantity is capable of being included in each of said signal frames;

request assigning means for assigning, according to said bit rates, said transmission requests to said signal frames as assigned requests;

request arranging means for arranging said assigned requests according to an intraframe bit rate order in each of said signal frames as ordered requests;

central timing means for timing a central timing signal;

launch timing means for timing, based on said central timing signal and in consideration of said base stations, launch start time instants of successively launching said signal frames simultaneously from said base stations;

switch time deciding means for deciding, relative to each of said launch start time instants, successive switching time instants of switching from one of said ordered requests to a next succeeding one of said ordered requests in said intraframe bit rate order for said each signal frame; and announcing means for announcing said ordered requests as announced requests to said base stations in response to said launch start time instants and said switching time instants in an announced signal specifying said launch start time instants and said switching time instants;

each of said base stations comprises:

signal receiving means for receiving said announced signal as a received signal specifying said announced requests and said launch start time instants and said switching time instants as received requests, received start instants, and received switching instants, respectively;

base timing means for timing a base timing signal in time coincidence with said central timing signal;

clock generating means, responsive to said base timing signal, for generating a plurality of clock sequences in one-to-one correspondence to said bit rates in phase coincidence with said base timing signal;

clock selecting means for selecting base clock sequences from said plurality of clock sequences in accordance with said intraframe bit rate order at each of said received start instants and successively at said received switching instants;

request reproducing means responsive to said base clock sequences for reproducing a sequence of reproduced requests, having serial request numbers, in correspondence to said received requests; and signal transmitting means for transmitting said reproduced requests as said call radio signals at said received start instants to at least one of said service areas assigned to said each base station; and wherein said signal transmitting means transmits said call radio signals with a common preamble placed immediately preceding said reproduced requests in each of said call radio signals to said service areas, respectively, wherein one of said bit rates and another of said bit rates have a greatest common measure other than a small integer.

6. A selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, wherein:

said central station comprises:

request receiving means for receiving at a time a call request quantity of incoming call requests of said bit rates as transmission requests, wherein said call request quantity is capable of being included in each of said signal frames;

request assigning means for assigning, according to said bit rates, said transmission requests to said signal frames as assigned requests;

request arranging means for arranging said assigned requests according to an intraframe bit rate order in each of said signal frames as ordered requests;

central timing means for timing a central timing signal;
launch timing means for timing, based on said central timing signal and in consideration of said base stations, launch start time instants of successively launching said signal frames simultaneously from said base stations;
switch time deciding means for deciding, relative to each of said launch start time instants, successive switching time instants of switching from one of said ordered requests to a next succeeding one of said ordered requests in said intraframe bit rate order for said each signal frame; and
announcing means for announcing said ordered requests as announced requests to said base stations in response to said launch start time instants and said switching time instants in an announced signal specifying said launch start time instants and said switching time instants;

each of said base stations comprises:
signal receiving means for receiving said announced signal as a received signal specifying said announced requests and said launch start time instants and said switching time instants as received requests, received start instants, and received switching instants, respectively;
base timing means for timing a base timing signal in time coincidence with said central timing signal;
clock generating means, responsive to said base timing signal, for generating a plurality of clock sequences in one-to-one correspondence to said bit rates in phase coincidence with said base timing signal;
clock selecting means for selecting base clock sequences from said plurality of clock sequences in accordance with said intraframe bit rate order at each of said received start instants and successively at said received switching instants;
request reproducing means responsive to said base clock sequences for reproducing a sequence of reproduced requests, having serial request numbers, in correspondence to said received requests; and
signal transmitting means for transmitting said reproduced requests as said call radio signals at said received start instants to at least one of said service areas assigned to said each base station;
wherein said launch timing means times each of said launch start time instants by using said central timing signal in said request arranging means while taking into consideration both a longest propagation delay for said announced signal to reach a remotest station of said base stations and a maximum processing time for said base stations to transmit said call radio signals after processing said received signal.

7. A selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, wherein:
said central station comprises:
request receiving means for receiving at a time a call request quantity of incoming call requests of said bit rates as transmission requests, wherein said call request quantity is capable of being included in each of said signal frames;
request assigning means for assigning, according to said bit rates, said transmission requests to said signal frames as assigned requests;
request arranging means for arranging said assigned requests according to an intraframe bit rate order in each of said signal frames as ordered requests;
central timing means for timing a central timing signal;
launch timing means for timing, based on said central timing signal and in consideration of said base stations, launch start time instants of successively launching said signal frames simultaneously from said base stations;
switch time deciding means for deciding, relative to each of said launch start time instants, successive switching time instants of switching from one of said ordered requests to a next succeeding one of said ordered requests in said intraframe bit rate order for said each signal frame; and
announcing means for announcing said ordered requests as announced requests to said base stations in response to said launch start time instants and said switching time instants in an announced signal specifying said launch start time instants and said switching time instants;

each of said base stations comprises:
signal receiving means for receiving said announced signal as a received signal specifying said announced requests and said launch start time instants and said switching time instants as received requests, received start instants, and received switching instants, respectively;
base timing means for timing a base timing signal in time coincidence with said central timing signal;
clock generating means, responsive to said base timing signal, for generating a plurality of clock sequences in one-to-one correspondence to said bit rates in phase coincidence with said base timing signal;
clock selecting means for selecting base clock sequences from said plurality of clock sequences in accordance with said intraframe bit rate order at each of said received start instants and successively at said received switching instants;
request reproducing means responsive to said base clock sequences for reproducing a sequence of reproduced requests, having serial request numbers, in correspondence to said received requests; and
signal transmitting means for transmitting said reproduced requests as said call radio signals at said received start instants to at least one of said service areas assigned to said each base station;

said announcing means announces said ordered requests with serial request numbers given in each signal frame to ordered packets, respectively; and
said each base station further comprises power reducing means, between said request reproducing means and said signal transmitting means, for detecting an omitted request number in the serial request numbers reproduced in said sequence of reproduced requests, wherein said power reducing means reduces a transmission power of said signal transmitting means during a time interval in which one of said reproduced requests having said omitted request number is transmitted in said call radio signals.

8. A selective call radio network as claimed in claim 7, said launch start time instants being in one-to-one correspondence to said signal frames, wherein:
said request assigning means comprises a plurality of request editing units, equal in number to a quantity of said bit rates, for selecting said transmission requests in accordance with said bit rates as selected requests of primary sequences, respectively, which are in correspondence to said bit rates, and which have a first sum sequence length corresponding to said call request quantity;

wherein said request arranging means comprises:
a plurality of call packet editing units, corresponding to said bit rates, for editing said selected requests of the primary sequences according to a first format, with a relevant bit rate of said bit rates specified in said first format, into call packets of secondary sequences, respectively, which have a second sum sequence length corresponding to said call request quantity;
a control packet editing unit for editing said each signal frame and said selected requests of the primary sequences according to a second predetermined format into a control packet with said control packet made to form, in cooperation with the call packets of said secondary sequences, a packet group for said each signal frame; and
a format accomplishing unit for arranging the call packets and the control packet of said packet group into said ordered packets for use as said ordered requests with said control packet placed first and with the call packets in said packet group consecutively following the control packet according to said bit rate order, wherein said format accomplishing unit, along with said launch timing means and said switch time deciding means, causes each of said call packets to include according to said first format and causes said control packet to include according to said second format, said serial packet numbers of the control packet and the call packets of said packet group in an ascending order, and a common start time instant of said launch start time instants that corresponds to said each signal frame, and wherein said format accomplishing unit furthermore causes said control packet to include according to said second format said switching time instants; and
wherein said announcing means announces said ordered packets in said announced signal specifying, for said each signal frame, the transmission requests of said call request quantity, said relevant bit rate in each of said call packets, said serial packet numbers and said common launch start time instant in said ordered packets, and said switching time instants in said control packet.

9. A selective call radio network as claimed in claim 8, wherein:
said clock generating means comprises:
a clock generator for generating a generated clock signal;
a pulse generator for generating a pulse signal in phase coincidence with said base timing signal; and
a plurality of frequency dividers, equal in number to said quantity of bit rates, for frequency dividing a clock frequency of said generated clock signal by said bit rates, respectively, to produce the clock signals of said plurality of frequency dividers, respectively, wherein said plurality of frequency dividers are reset by said pulse signal;
wherein said plurality of frequency dividers is equal to a positive integer greater than one, said switching instant is equal in number to said positive integer less one, and the clock signals of said plurality of frequency dividers consist of one clock sequence and at least one remaining clock sequence;
said clock selecting means comprising:

a plurality of counters, equal to or greater than in number to said received switching instants, for counting counts, when enabled, respectively, to a common end count in response to said at least one remaining clock sequence;
a time coincidence detector for enabling said counters upon detection of time coincidence between said base timing signal and each of said received start instants;
an initial count setting unit for setting at least one initial count in said counters, respectively, in said intraframe bit rate order at each of said received switching instants; and
a selector for selecting, from the clock signals of said plurality of frequency dividers as said base clock sequences, said one clock sequence at said time coincidence and said at least one remaining clock sequence in response to said counts.

10. A selective call radio network as claimed in claim 9, wherein in each of said base stations:
said signal receiving means produces a tertiary sequence of a received control packet and a plurality of received call packets for said each signal frame as said received requests in said received signal to identify the transmission requests, the relevant bit rate in connection with each of said received requests, the launch start time instants as said received start instants, and as said received time instants the switching time instants which are indicated by said received signals; and
said request reproducing means reproduces said reproduced requests for said each signal frame with said transmission requests arranged in said intraframe bit rate order in request groups starting at each of said received start instants and switched from one of said request groups to a next succeeding one of said request groups at each of said received switching instants.

11. A central station for use in a selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, wherein said central station comprises:
request receiving means for receiving at a time a call request quantity of incoming call requests of said bit rates as transmission requests, wherein said call request quantity is capable of being included in each of said signal frames;
request assigning means for assigning, according to said bit rates, said transmission requests to said signal frames as assigned requests;
request arranging means for arranging said assigned requests according to a intraframe bit rate order in each of said signal frames as ordered requests;
central timing means for timing a central timing signal;
launch timing means for timing, based on said central timing signal and in consideration of said base stations, launch start time instants of respectively launching said signal frames simultaneously from said base stations;
switching time deciding means for deciding, relative to each of said launch start time instants, successive switching time instants of switching from one of said bit rates to a next succeeding one of said bit rates in said intraframe bit rate order for said each signal frame; and announcing means for announcing said ordered requests as an announced signal to said base stations in response to said launch start time instants and said switching time instants, wherein said announced signal specifies said launch start time instants and said switching time instants.

12. A central station as claimed in claim 11, wherein:
said central timing means comprises:
  a standard time generator for generating a standard timing signal as a network phase prototype; and
  a clock extractor for extracting said central timing signal from said standard timing signal;
said request assigning means comprises a plurality of request editing units, equal in number to a quantity of said bit rates, for selecting said transmission requests in accordance with said bit rates as the assigned requests of primary sequences, respectively, which are in correspondence to said bit rates and wherein said assigned requests of primary sequences have a first sum request length corresponding to said call request quantity;
said request arranging means comprises:
  a plurality of call packet editing units, corresponding to said bit rates, for editing said assigned requests of the primary sequences according to a first format, with a relevant bit rate of said bit rates specified in said first format, into call packets of secondary sequences, respectively, which have a second sum request length corresponding to said call request quantity;
  a control packet editing unit for editing said assigned requests of the primary sequences according to a predetermined second format into a control packet with said control packet made to form, in cooperation with the call packets of said secondary sequences, a packet group for said each signal frame; and
  wherein a format accomplishing unit, along with said launch timing means and said switch time deciding means, causes each of said call packets to include, according to said first format, and causes said control packet to include, according to said second format, a common start time instant of said launch start time instants that corresponds to said each signal frame, and wherein said format accomplishing unit furthermore causes said control packet to include, according to said second format, said switching time instants, and wherein said format accomplishing unit arranges the call packets and the control packet of said packet group into ordered packets for use as said ordered requests with said control packet placed first in said packet group and with the call packets consecutively following said control packet according to said bit rate order; and
  wherein said announcing means announces said ordered packets in said announced signal specifying, for said each signal frame, said transmission requests of said call request quantity, said relevant bit rate in each of said transmission requests, said common start time instant, and said switching time instants.

13. A central station as claimed in claim 11, said base stations simultaneously transmitting said call radio signals with a common preamble placed immediately preceding each of said ordered requests in each of said call radio signals to said service areas, respectively, wherein one of said bit rates and another of said bit rates have a greatest common measure other than a small integer.

14. A central station as claimed in claim 11, wherein said launch timing means times each of said launch start time instants by using said central timing signal in said request arranging means while taking into consideration both a longest propagation delay for said announced signal to reach a remotest station of said base stations and a maximum processing time for said base stations to transmit said call radio signals after receiving said announced signal.

15. A base station for use in a selective call radio network for selectively calling a number of mobile units responsive to call radio signals transmitted in signal frames and at a plurality of bit rates and movable in an overall area comprising service areas, wherein each of said service areas is assigned to at least one of a plurality of base stations which are connected to a central station, and wherein two adjacent service areas have an overlapping area, said central station receiving at a time a call request quantity of incoming call requests of said bit rates as transmission requests, wherein said call request quantity is capable of being included in each of said signal frames, wherein said central station includes central timing means for timing a central timing signal as a network phase prototype, launch timing means for timing launch start time instants of respectively launching said signal frames simultaneously from said base stations based on said central timing signal and in consideration of said base stations, and switch timing means for deciding, relative to each of said launch start time instants, successive switching time instants of switching in a bit rate order one of said bit rates to a next succeeding one of said bit rates, and wherein said central station announces said transmission requests in said bit rate order as announced requests to said base stations in response to said launch start time instants in an announced signal specifying said launch start time instants and said switching time instants, wherein said base station comprises:
  signal receiving means for receiving said announced signal as a received signal specifying said transmission requests and said launch start time instants and said switching time instants as received requests, received start instants, and received switching instants, respectively;
  base timing means for timing a base timing signal in time coincidence with said central timing signal;
  clock generating means, responsive to said base timing signal, for generating a plurality of clock sequences in one-to-one correspondence to said bit rates in phase coincidence with said base timing signal;
  clock selecting means for selecting base clock sequences from said plurality of clock sequences in accordance with said bit rate order at each of said received start instants and successively at said received switching instants;
  request reproducing means responsive to said base clock sequences for reproducing a sequence of reproduced requests in correspondence to said received requests; and
  signal transmitting means for transmitting said reproduced requests as said call radio signals at said received start instants to at least one of said service areas assigned to said base station.

16. A base station as claimed in claim 15, wherein:
said base timing means comprises:
  a standard time receiver for receiving as a received timing signal a standard timing signal generated in said central station; and
  a clock extractor for extracting said base timing signal from said received timing signal;
said clock generating means comprises:

a clock generator for generating a generated clock signal;

a pulse generator for generating a pulse signal as a network phase auxiliary prototype in phase coincidence with said base timing signal; and a plurality of frequency dividers, equal in number to a first quantity of said bit rates, for frequency dividing a clock frequency of said generated clock signal by said bit rates, respectively, to produce the clock sequences of said plurality of frequency dividers, respectively, wherein said plurality of frequency dividers are reset by said pulse signal;

wherein a second quantity of said plurality of frequency dividers is equal to a positive integer other than one, said received switching instants being equal in number to said positive integer less one, said clock sequences consisting of one clock sequence and at least one remaining clock sequence;

said clock selecting means comprises:

a plurality of counters, equal to or greater in number than said received switching instants, for counting counts, when enabled, to a common end count from at least one initial count in response to said at least one remaining clock sequence;

a time coincidence detector for enabling said counters upon detection of time coincidence between said base timing signal and each of said received start instants;

an initial count setting unit for setting said at least one initial count in said counters, respectively, in said bit rate order sequentially at said received switching time instants; and a selector for selecting from the clock sequences of said plurality of frequency dividers as said base clock sequences said one clock sequence at said time coincidence and said at least one remaining clock sequence in response to said counts.

17. A base station as claimed in claim 16, wherein said central station announces said announced signal for said each signal frame as said announced requests in a train of announced packets arranged in said bit rate order and wherein said train comprises a control packet placed first in said train and with a plurality of call packets successively following said control packet, wherein said control packet includes 1) a first packet number, 2) a common start time instant of said launch start time instants, and 3) said switching time instants specified within said control packet, and wherein each of said call packets includes 1) an individual packet number assigned in an ascending order of packet numbers relative to said first packet number, and 2) a relevant bit rate of said each call packet, wherein:

said signal receiving means comprises a packet receiving unit for receiving said announced packets as said received packets in a first sequence of received packets comprising said control packet and said call packets as a received control packet and received call packets with said packet numbers and said common time start instant specified in said received control packet and said received call packets, with said switching time instants specified in said received control packet, and with said relevant bit rate specified in each of said received call packets;

said request reproducing means comprises:

a packet rearranging unit for rearranging said received control packet and said received call packets of said first sequence of received packets into rearranged packets in accordance with said ascending order of packet numbers, and in accordance with said bit rate order with reference to said relevant bit rate starting at said common start time instant, and with one of said bit rates switched to a next succeeding one of said bit rates in said bit rate order at said switching time instants relative to said common start time instant;

a start coincident packet storing unit for confirming said common start time instant in the rearranged packets supplied to said start coincident packet storing unit, wherein said start coincident packet storing unit stores the rearranged packets of said common start time instant as stored packets of a second sequence according to said launch start time instants; and a request reproducing unit for making said start coincident packet storing unit confirm the packet numbers of said stored packets and for reproducing said transmission requests, starting at each of said launch start time instants, as said reproduced requests from the stored packets supplied to said request reproducing unit, except that the received control packet stored in said start coincident packet storing unit is not reproduced; and wherein said signal transmitting means transmits said reproduced requests as said call radio signals at said launch start time instants to said one of said at least one of said service areas.

18. A base station as claimed in claim 17, further comprising a packet compensating unit connected between said packet rearranging unit and said start coincident packet storing unit and connected to said signal transmitting means, for checking the packet numbers of said ascending order in said second sequence to find a missing number in the packet numbers of said second sequence and for producing a compensation packet specifying an unusual number and wherein said packet rearranging unit substitutes said compensation packet in said second sequence for one of said stored packets that has said missing number, and wherein said packet compensating unit reduces a transmission power of said signal transmitting means during a predetermined time interval in which said compensation packet is transmitted in said call radio signals.

19. A base station as claimed in claim 18, wherein said packet compensating unit reduces said transmission power during an entire signal frame period, when the reproduced control packet has said missing number in said second sequence.

20. A base station as claimed in claim 15, wherein said central station announces said announced requests with serial request numbers given in each signal frame to announced packets, respectively, wherein said base station further comprises power reducing means between said request reproducing means and said signal transmitting means for detecting an omitted number in the serial request numbers reproduced in said sequence of reproduced requests and wherein said power reducing means reduces a transmission power of said signal transmitting means during a predetermined time interval substantially equal to a transmission time of one of said reproduced requests having said omitted number.

* * * * *